US012586078B2

(12) United States Patent
Harris et al.

(10) Patent No.: US 12,586,078 B2
(45) Date of Patent: Mar. 24, 2026

(54) MANAGING COST DATA BASED ON COMMUNITY SUPPLIER AND COMMODITY INFORMATION

(71) Applicant: Coupa Software Incorporated, San Mateo, CA (US)

(72) Inventors: Scott Harris, Menlo Park, CA (US); Ahmad Sadeddin, San Francisco, CA (US); Vincent Toesca, San Francisco, CA (US)

(73) Assignee: Coupa Software Incorporated, Foster City, CA (US)

( * ) Notice: Subject to any disclaimer, the term of this patent is extended or adjusted under 35 U.S.C. 154(b) by 0 days.

(21) Appl. No.: 16/513,496

(22) Filed: Jul. 16, 2019

(65) Prior Publication Data

US 2021/0019758 A1     Jan. 21, 2021

(51) Int. Cl.
*G06Q 20/42* (2012.01)
*G06Q 30/04* (2012.01)
(Continued)

(52) U.S. Cl.
CPC .......... *G06Q 20/425* (2013.01); *G06Q 30/04* (2013.01); *G06Q 30/0637* (2013.01)

(58) Field of Classification Search
CPC ......... G06Q 20/42; G06Q 30/04; G06Q 30/06
(Continued)

(56) References Cited

U.S. PATENT DOCUMENTS

| | | | | | |
|---|---|---|---|---|---|
| 4,164,260 | A | * | 8/1979 | Blodgett | G01G 15/02 |
| | | | | | 177/1 |
| 4,752,877 | A | * | 6/1988 | Roberts | G06Q 40/06 |
| | | | | | 235/379 |

(Continued)

FOREIGN PATENT DOCUMENTS

| | | | | |
|---|---|---|---|---|
| CA | 2343901 A1 * | 3/2000 | | G06Q 40/04 |
| CN | 103955848 A * | 7/2014 | | |

(Continued)

OTHER PUBLICATIONS

English translation of CN-109359918-A, printed from Google Patents. Feb. 19, 2019 (Year: 2019).*

(Continued)

*Primary Examiner* — Ayal I. Sharon
(74) *Attorney, Agent, or Firm* — Baker Botts L.L.P.

(57) ABSTRACT

In an embodiment, a computer-implemented method comprises storing, in one or more data repositories, transactional data relating to past transactions involving a plurality of commodities between a plurality of buyer entities and a plurality of supplier entities; calculating metric data of one or more overages from the transactional data, wherein each of the one or more overages indicates an amount to which a cost of a commodity item as specified in an invoice exceeds a cost of the commodity item as specified in a requisition or a purchase order, the invoice being generated in response to the requisition or the purchase order; receiving, from a computer associated with a buyer entity, a request to generate a requisition or a purchase order for one or more (Continued)

commodity items; identifying, from the request, a supplier identification (ID) associated with a particular supplier entity of the plurality of supplier entities or a commodity ID associated with a particular commodity of the plurality of commodities, for a particular commodity item of the one or more commodity items; calculating a projected total cost for the particular commodity item from the metric data using the supplier ID or the commodity ID, the projected total cost indicating a probable cost for the particular commodity item based on previous transactions that included the particular commodity item and particular supplier entity; in response to determining that the projected total cost for the particular commodity item is less than a threshold value, transmitting an approval of ordering the particular commodity item.

17 Claims, 5 Drawing Sheets

(51) Int. Cl.
  *G06Q 30/06*        (2012.01)
  *G06Q 30/0601*      (2023.01)
(58) Field of Classification Search
  USPC ......................................................... 705/44
  See application file for complete search history.

(56)                    References Cited

U.S. PATENT DOCUMENTS

| | | | | | |
|---|---|---|---|---|---|
| 6,907,402 | B1 * | 6/2005 | Khaitan | ................. | G06Q 40/04 |
| | | | | | 705/37 |
| 7,082,408 | B1 * | 7/2006 | Baumann | ........... | G06Q 30/0633 |
| | | | | | 705/28 |
| 7,478,061 | B1 * | 1/2009 | Spreng | ................. | G06Q 20/102 |
| | | | | | 705/24 |
| 8,204,809 | B1 * | 6/2012 | Wise | ...................... | G06Q 40/06 |
| | | | | | 705/36 R |
| 9,245,291 | B1 * | 1/2016 | Ballaro | .............. | G06Q 30/0635 |
| 11,449,844 | B1 * | 9/2022 | Harris | .................. | G06Q 20/102 |
| 2002/0013758 | A1 * | 1/2002 | Khaitan | ................. | G06Q 40/04 |
| | | | | | 705/37 |
| 2002/0046134 | A1 * | 4/2002 | Egashira | ............ | G06Q 30/0633 |
| | | | | | 705/26.3 |
| 2002/0107713 | A1 * | 8/2002 | Hawkins | ............ | G06Q 30/0635 |
| | | | | | 703/345 |
| 2002/0128938 | A1 * | 9/2002 | Ronald Schofield | .. | G06Q 40/00 |
| | | | | | 705/35 |
| 2002/0133368 | A1 * | 9/2002 | Strutt | ...................... | G06Q 30/02 |
| | | | | | 705/7.11 |
| 2003/0149578 | A1 * | 8/2003 | Wong | ................... | G06Q 10/087 |
| | | | | | 705/7.22 |
| 2003/0177070 | A1 * | 9/2003 | Viswanath | ............. | G06Q 99/00 |
| | | | | | 705/500 |
| 2004/0006503 | A1 * | 1/2004 | Jarvis | ...................... | G06Q 10/10 |
| | | | | | 705/7.31 |
| 2004/0073507 | A1 * | 4/2004 | Scott | ...................... | G06Q 30/08 |
| | | | | | 705/37 |
| 2004/0210510 | A1 * | 10/2004 | Cullen, III | ............. | G06Q 40/04 |
| | | | | | 705/37 |

| | | | | | |
|---|---|---|---|---|---|
| 2006/0036507 | A1 * | 2/2006 | Pujar | ................... | G06Q 10/087 |
| | | | | | 705/26.8 |
| 2007/0050229 | A1 * | 3/2007 | Tatro | .................... | G06Q 10/087 |
| | | | | | 705/15 |
| 2007/0050275 | A1 * | 3/2007 | Hunsicker | ........... | G06Q 10/087 |
| | | | | | 705/35 |
| 2009/0083057 | A1 * | 3/2009 | Bhakta | ................... | G06Q 30/00 |
| | | | | | 705/20 |
| 2009/0271231 | A1 * | 10/2009 | Buddenbaum | ..... | G06Q 10/0875 |
| | | | | | 705/29 |
| 2009/0327146 | A1 * | 12/2009 | Johnson | ................. | G06Q 20/10 |
| | | | | | 705/64 |
| 2010/0131402 | A1 * | 5/2010 | Davies | ................... | G06Q 99/00 |
| | | | | | 705/37 |
| 2013/0018785 | A1 * | 1/2013 | Dolphin | ................. | G06Q 20/10 |
| | | | | | 705/40 |
| 2013/0254085 | A1 * | 9/2013 | Tanimoto | ............... | G06Q 40/04 |
| | | | | | 705/37 |
| 2014/0278707 | A1 * | 9/2014 | Rothley | .......... | G06Q 10/06315 |
| | | | | | 705/7.25 |
| 2014/0279509 | A1 * | 9/2014 | Khilnani | ................ | G06Q 20/12 |
| | | | | | 705/44 |
| 2015/0019454 | A1 * | 1/2015 | Helseth | ............. | G06Q 10/0831 |
| | | | | | 705/331 |
| 2015/0228005 | A1 * | 8/2015 | Nambiar | ........... | G06Q 30/0635 |
| | | | | | 705/26.81 |
| 2016/0110788 | A1 * | 4/2016 | Stephenson | ........ | G06Q 30/0201 |
| | | | | | 705/7.29 |
| 2016/0300277 | A1 * | 10/2016 | Marlowe | ............. | G06Q 10/083 |
| 2016/0358256 | A1 * | 12/2016 | Healy | ................... | G06Q 40/04 |
| 2016/0379301 | A1 * | 12/2016 | Feldman | ............... | G06Q 30/08 |
| | | | | | 705/26.2 |
| 2017/0017922 | A1 * | 1/2017 | Wicks | ................ | G06Q 10/0838 |
| 2017/0270596 | A1 * | 9/2017 | Nagalkar | .......... | G06Q 30/0637 |
| 2019/0066115 | A1 * | 2/2019 | Harris | ............. | G06Q 10/06395 |
| 2019/0147509 | A1 * | 5/2019 | Mehta | .................... | H04L 67/10 |
| | | | | | 705/7.39 |

FOREIGN PATENT DOCUMENTS

| | | | | | |
|---|---|---|---|---|---|
| CN | 107832968 | A | * | 3/2018 | ....... G06Q 10/06315 |
| CN | 108108942 | A | * | 6/2018 | |
| CN | 109359918 | A | * | 2/2019 | .......... G06Q 10/087 |
| FR | 2979449 | A1 | * | 3/2013 | ............ G06Q 40/02 |

OTHER PUBLICATIONS

Google Patents English Language Translation of CN-109359918-A. https://patents.google.com/patent/CN109359918A/en?oq=CN-109359918-A (Year: 2023).*

Google Patents English Language Translation of CN-108108942-A. https://patents.google.com/patent/CN108108942A/en?oq=CN-108108942-A (Year: 2023).*

Google Patents English Language Translation of CN-107832968-A. https://patents.google.com/patent/CN107832968A/en?oq=CN-107832968-A (Year: 2023).*

Google Patents English Language Translation of CN-103955848-A. https://patents.google.com/patent/CN103955848A/en?oq=CN-103955848-A (Year: 2023).*

* cited by examiner

Figure 3:
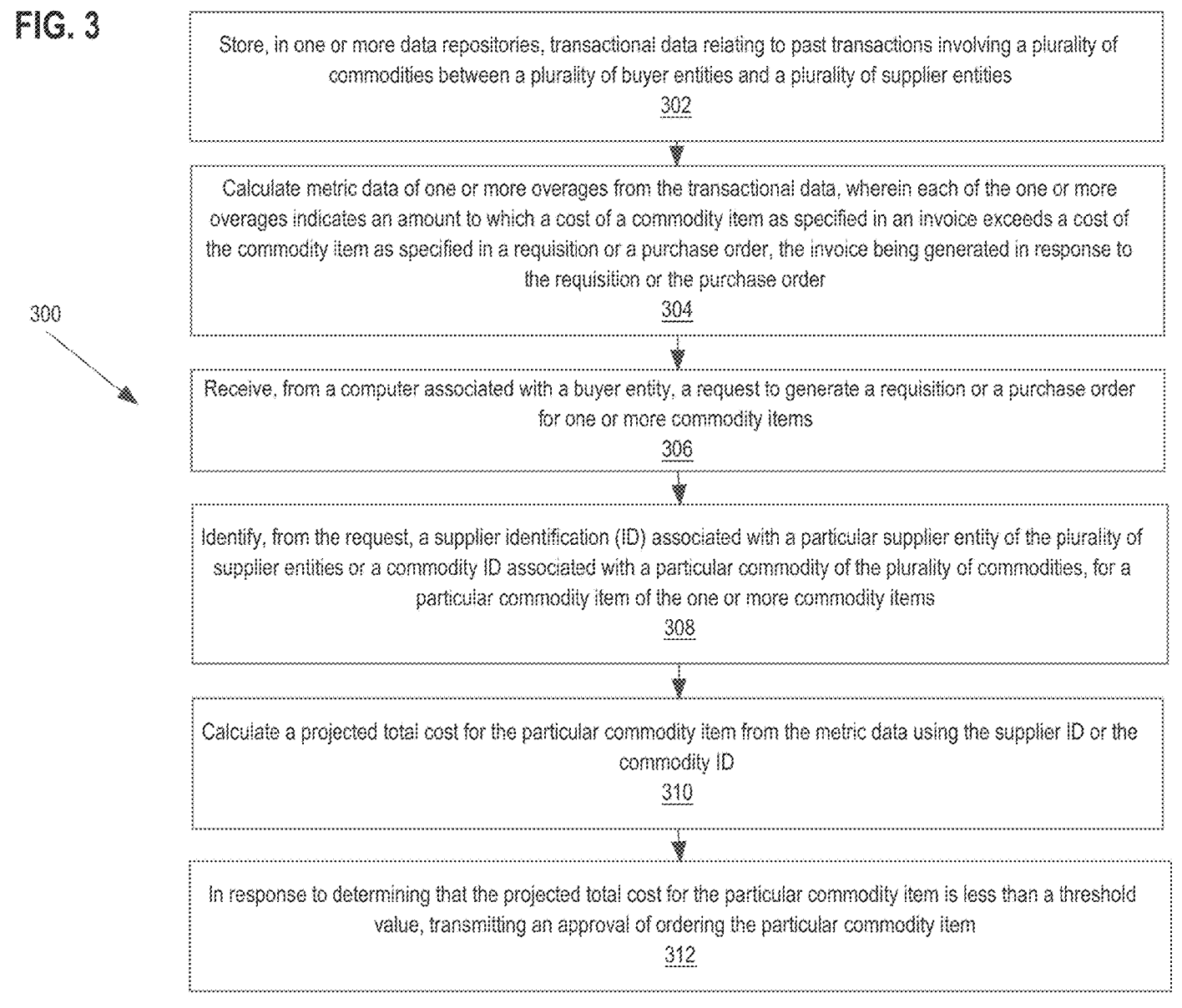

Store, in one or more data repositories, transactional data relating to past transactions involving a plurality of commodities between a plurality of buyer entities and a plurality of supplier entities
302

Calculate metric data of one or more overages from the transactional data, wherein each of the one or more overages indicates an amount to which a cost of a commodity item as specified in an invoice exceeds a cost of the commodity item as specified in a requisition or a purchase order, the invoice being generated in response to the requisition or the purchase order
304

Receive, from a computer associated with a buyer entity, a request to generate a requisition or a purchase order for one or more commodity items
306

Identify, from the request, a supplier identification (ID) associated with a particular supplier entity of the plurality of supplier entities or a commodity ID associated with a particular commodity of the plurality of commodities, for a particular commodity item of the one or more commodity items
308

Calculate a projected total cost for the particular commodity item from the metric data using the supplier ID or the commodity ID
310

In response to determining that the projected total cost for the particular commodity item is less than a threshold value, transmitting an approval of ordering the particular commodity item
312

MANAGING COST DATA BASED ON COMMUNITY SUPPLIER AND COMMODITY INFORMATION

TECHNICAL FIELD

The present disclosure relates generally to computer-implemented techniques for digital data analysis and communication. The present disclosure also relates to estimating procurement costs by learning from community overage data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

There exist electronic spend management systems that help buyers or buyer accounts manage their electronic procurement (purchasing) activities. Such e-procurement activities may include electronic generation of purchase orders for submission to suppliers. Depending on the system, such activities may also include electronically submitting purchase orders to suppliers or supplier accounts and electronically receiving and approving payment of invoices from suppliers.

Historically, electronic spend management systems were enterprise in nature with each buyer account separately purchasing and maintaining their own system instance on their premises. Today, many buyer accounts use SaaS-based electronic spend management systems, for example, to conduct e-procurement activities. Such an electronic spend management system therefore manages procurement activities for multiple buyer accounts.

One challenge buyer accounts face is facilitating an efficient procure-to-pay process. A procure-to-pay process is a process in which businesses inquire, request, receive, and then pay for commodities such as raw goods and services. A procure-to-pay process involves numerous tedious steps to complete just one order.

Conventional procure-to-pay processes involve a buyer account selecting commodities offered by a supplier and creating a purchase order to request a purchase of the selected commodities from the supplier. After receiving a purchase order, a supplier generates an invoice based on the purchase order that specifies a final amount to be paid for the requested commodities. An invoice generated in response to a purchase order may specify a price per commodity item or total price that is greater than the price listed on the purchase order. This may occur for several reasons including shipping and handling fees not included in the purchase order, additional processing fees not included in the purchase order, excess hours for services, and other miscellaneous unforeseen costs.

When a price of a commodity item or group of commodities specified in an invoice is greater than a price of the commodity item or group of commodities listed in a corresponding purchase order, an overage occurs. Although overages are common, the extent and unpredictability of an overage may come as a surprise to a buyer account who believes they are purchasing commodities for the price listed in a purchase order.

Overages can wreak havoc in traditional business environments where approval is required from multiple levels of management in order to create a purchase order. Receiving an invoice with a large overage may require a buyer account to move funds to cover the overage or cancel an order and look elsewhere for the same or lesser commodities, only to repeat the process again and receive an invoice with an unpredictable overage amount. The unpredictability of overages can result in large amounts of wasted time and computer resources as part of the procure-to-pay process. In addition to overages that cause downstream inefficiencies, the conventional procure-to-pay process is prone to malicious attacks because of the wide range of input sources and multiple access points to sensitive procurement data that occur throughout the process.

Techniques are desired for more accurately predicting overages and streamlining data processing to result in a more efficient and secure procure-to-pay process.

Computer-implemented techniques disclosed herein address these and other issues.

SUMMARY

The appended claims may serve as a summary of the invention.

BRIEF DESCRIPTION OF THE DRAWINGS

In the drawings:

FIG. 3 depicts a flowchart of an example process for improved procure-to-pay in an electronic spend management system based on supplier and commodity information from a community of buyer accounts, according to an embodiment.

DETAILED DESCRIPTION

Figure 1:
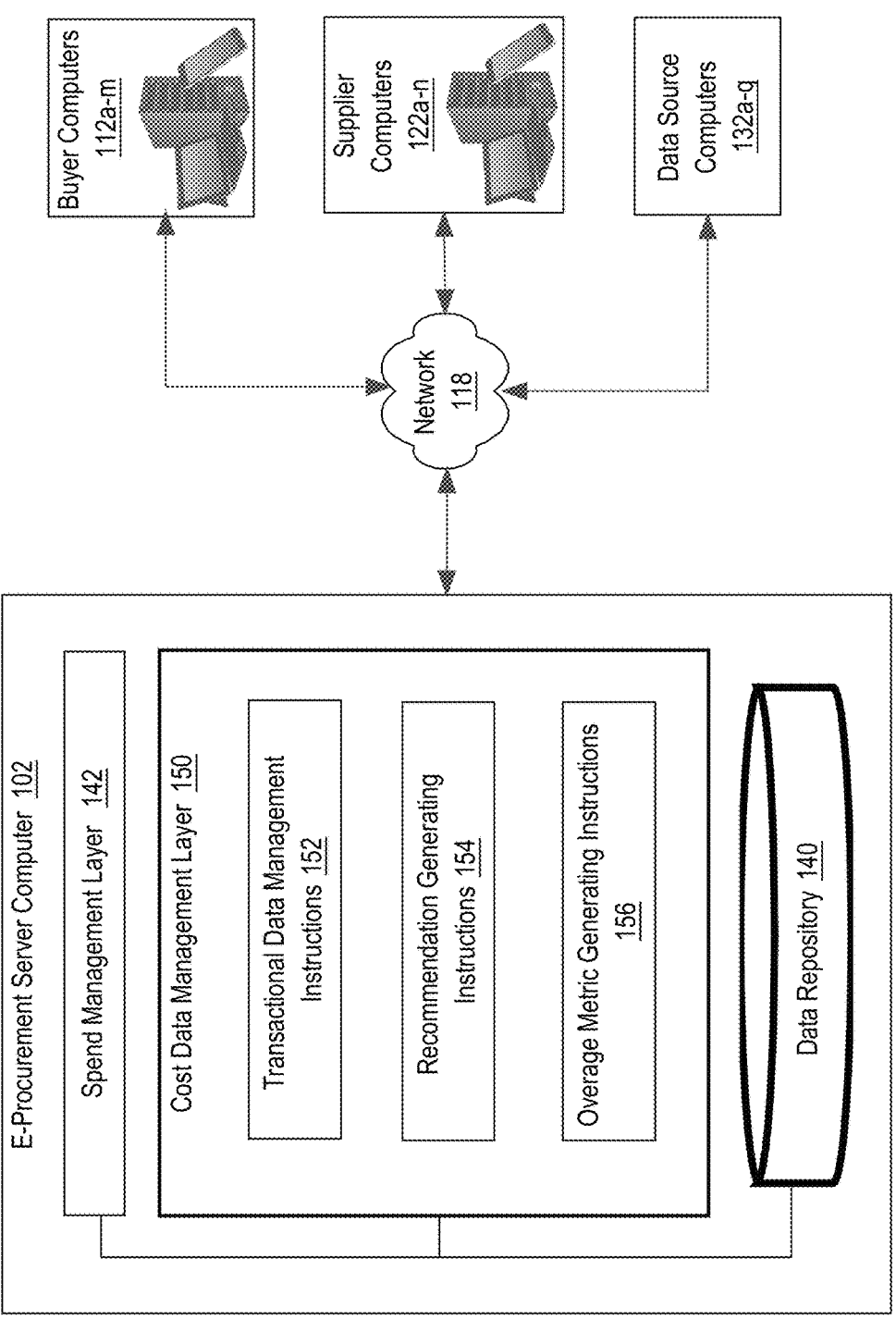
FIG. 1 depicts an example networked computing environment, according to an embodiment.

In the following detailed description, for the purposes of explanation, numerous specific details are set forth in order to provide a thorough understanding of various embodiments of improved linking of buyer accounts with suppliers in an electronic spend management system based on community overage data. It will be apparent, however, that the embodiments may be practiced without these specific details. In other instances, well-known structures and devices are shown in block diagram form in order to avoid unnecessarily obscuring the embodiments.

Embodiments are described in sections according to the following outline:

1.0 GENERAL OVERVIEW
2.0 EXAMPLE NETWORKED COMPUTER SYSTEM
3.0 EXAMPLE PROCURE-TO-PAY PROCESS
4.0 EXAMPLE PROCEDURE
5.0 EXAMPLE GRAPHICAL USER INTERFACE
6.0 IMPLEMENTATION EXAMPLE—HARDWARE OVERVIEW
7.0 EXTENSIONS AND ALTERNATIVES

1.0 General Overview

Techniques are provided for improving the procure-to-pay process by accurately projecting total cost of a requisition or purchase order based on community supplier and commodity information. In an embodiment, a computer-implemented method comprises storing, in one or more data repositories, transactional data relating to past transactions involving a plurality of commodities between a plurality of buyer entities and a plurality of supplier entities; calculating metric data of one or more overages from the transactional data, wherein each of the one or more overages indicates an amount to which a cost of a commodity item as specified in an invoice exceeds a cost of the commodity item as specified in a requisition or a purchase order, the invoice being generated in response to the requisition or the purchase order; receiving, from a computer associated with a buyer entity, a request to generate a requisition or a purchase order for one or more commodity items; identifying, from the request, a supplier identification (ID) associated with a particular supplier entity of the plurality of supplier entities or a commodity ID associated with a particular commodity of the plurality of commodities, for a particular commodity item of the one or more commodity items; calculating a projected total cost for the particular commodity item from the metric data using the supplier ID or the commodity ID, the projected total cost indicating a probable cost for the particular commodity item based on previous transactions that included the particular commodity item and particular supplier entity; in response to determining that the projected total cost for the particular commodity item is less than a threshold value, transmitting an approval of ordering the particular commodity item.

Techniques discussed herein enhance the procure-to-pay process by facilitating the automatic approval of requisitions, automatic generation of purchase orders, and automatic approval of invoices for payment based on the enhanced pricing projections as discussed herein. As a result, compute resources and memory are conserved by reducing the amount of stalled and restarted agreements due to unexpected overages. Thus, the techniques herein result in a procure-to-pay process that uses fewer CPU cycles and less memory to complete a commodity order and also enhanced data accuracy by automatically adding hidden or additional anticipated costs to requisition and purchase orders.

2.0 Example Networked Computer System

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 ("server"), one or more supplier computers 122a-n, one or more buyer computers 112a-m, and one or more data source computers 132, which are communicatively coupled directly or indirectly via one or more networks 118.

In some embodiments, the server 102 broadly represents one or more computers, such as a server farm, a cloud computing platform, or a parallel computer, virtual computing instances, and/or instances of a server-based application.

The server 102 may comprise a spend management layer 142 that is programmed or configured to host or execute functions including but not limited to managing buyer accounts associated with the one or more buyer computers 112a-m and supplier accounts associated with the one or more supplier computers 122a-n, and facilitating generation and maintenance of digital documents during procurement transactions between buyer accounts and supplier accounts, such as catalogs, purchase requisitions, purchase orders, or invoices. The server 102 also comprises a cost data management layer 150 that is programmed or configured to host or execute functions including but not limited to calculating overage metrics associated with commodity items and/or supplier accounts and generating recommendation for alternate suppliers to buyer accounts. In general, a commodity is a description of the type of product or service being purchased. A commodity item is a specific product or service being purchased.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the cost data management layer 150 can comprise computer-executable instructions, including transactional data management instructions 152, recommendation generating instructions 154, and overage metric generating instructions 156. In addition, the server 102 can comprise a database module 140.

In some embodiments, the transactional data management instructions 152 enable collecting and transmitting transactional data or documents, such as catalogs, purchase requisitions, purchase orders, or invoices, between supplier computers and buyer computers and maintaining the transactional data in memories. Specifically, the transaction data management instructions 152 enable managing the transactional data by semantic units, such as individual item descriptions or prices. For example, a catalog retrieved from a supplier computer can be parsed into these semantic units, or a graphical user interface can be presented for entering or selecting such semantic units in generating a purchase requisition. Additional metadata that may not be part of the transactional data can also be stored with the transactional data, such as the date of creation or the list of accounts accessing the transactional data.

In some embodiments, the recommendation generating instructions 154 enable generating recommendations for alternative suppliers for one or more commodity items based on metric data of one or more overages or for alternative products by the same or different suppliers. The recommendation generating instructions 154 may include instructions that send alerts or recommendations to a buyer computer of a buyer account and may automatically approve requisition or purchase orders based on metric data of one or more overages.

In some embodiments, the overage metric generating instructions 156 enable analyzing transactional data and calculating or generating metric data of one or more overages. Overage metric generating instructions 156 may also enable the calculation of a projected total cost of a commodity item or plurality of commodity items based on metric data of one or more overages associated with specific commodity items and/or specific suppliers.

In some embodiments, the database module 140 is programmed or configured to manage relevant data structures and store relevant data for functions performed by the server 102. In association with the cost data management layer 150, the data may include supplier data, buyer data, transactional data, overage data including one or more overages, metric data of one or more overages, dispute metric data, and/or rejected invoice metric data.

In some embodiments, each of the buyer computers 112a-m broadly represents one or more computers, virtual computing instances, and/or instances of an e-procurement application program that are associated with an institution or entity that is related as a buyer account with respect to a separate entity associated with one of the supplier computers 122a-n. A buyer computer 112a is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112a may comprise a desktop computer, laptop computer, tablet computer, smartphone, wearable device, or any other type of computing device that is capable of proper communication with the server 102 as well as adequate local data processing and storage. In some cases, a buyer computer 112a may be a personal computer or workstation that hosts or executes a browser and communicates via HTTP and HTML over the network 118 with a server-side e-procurement application hosted or executed at the server 102. In other cases, a buyer computer 112a may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122a-n broadly represents one or more computers, virtual computing instances, and/or instances of an e-procurement application program that are associated with an institution or entity that is related as a supplier with respect to a separate entity associated with one of the buyer computer 112a-m. A supplier computer 122a is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122a may comprise a desktop computer, laptop computer, tablet computer, smartphone, wearable device, or any other type of computing device that is capable of proper communication with the server as well as adequate local data processing and storage. In some cases, a supplier computer 122a may be a personal computer or workstation that hosts or executes a browser and communicates via HTTP and HTML over network 118 with a server-side e-procurement application hosted or executed at the server 102. In other cases, a supplier computer 122a may be a server-class computer and/or virtual computing instance that hosts or executes an instance of an e-procurement application that communicates programmatically via API calls, RPC or other programmatic messaging with the server 102.

In some embodiments, each of the data source computer 132a-q broadly represents one or more computers, virtual computing instances, and/or instances of a data management application program with a communication interface. A data source computer 132a is programmed to manage one or more data sources, receive a request for certain data in the one or more data sources from the server 102, and send a response to the request to the server 102. The data source computer 132a can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the cost data management layer 150, the server 102 is programmed to receive or transmit transactional data, such as metric data of one or more overages, purchase requisitions, purchase orders, or invoices, from or to the buyer computers 112a-m or the supplier computers 122a-n. In other embodiments, the server 102 is programmed to receive or transmit transactional data, such as purchase requisitions, purchase orders, or invoices, from or to one of the buyer computers 112a-112m representing a requester from an organization and another one of the buyer computers 112a-112m representing an approver from the same organization, and similarly from or to one of the supplier computers 122a-112n representing an organization and another one of the supplier computers 122a-122n representing an organization. The server 102 is programmed to also store such transactional data in association with the appropriate accounts in a storage device, such as the data repository 140. Such transactional data may include metric data of one or more overages calculated or determined by the server 102. The server 102 is programmed to further receive additional data from the data source computers 132a-q that can be used to assess the transactional data communicated between one of the supplier computer 122a-n and one of the buyer computers 112a-m. The additional data may include industry-wide prices of certain items sold by a supplier account or annual revenue or spending data associated with a buyer account. The server 102 is programmed to also store such additional data in a storage device, such as the data repository 140 and to calculate metric data of one or more overages based on the stored or received data.

3.0 Example Procure-to-Pay Process

Figure 2:
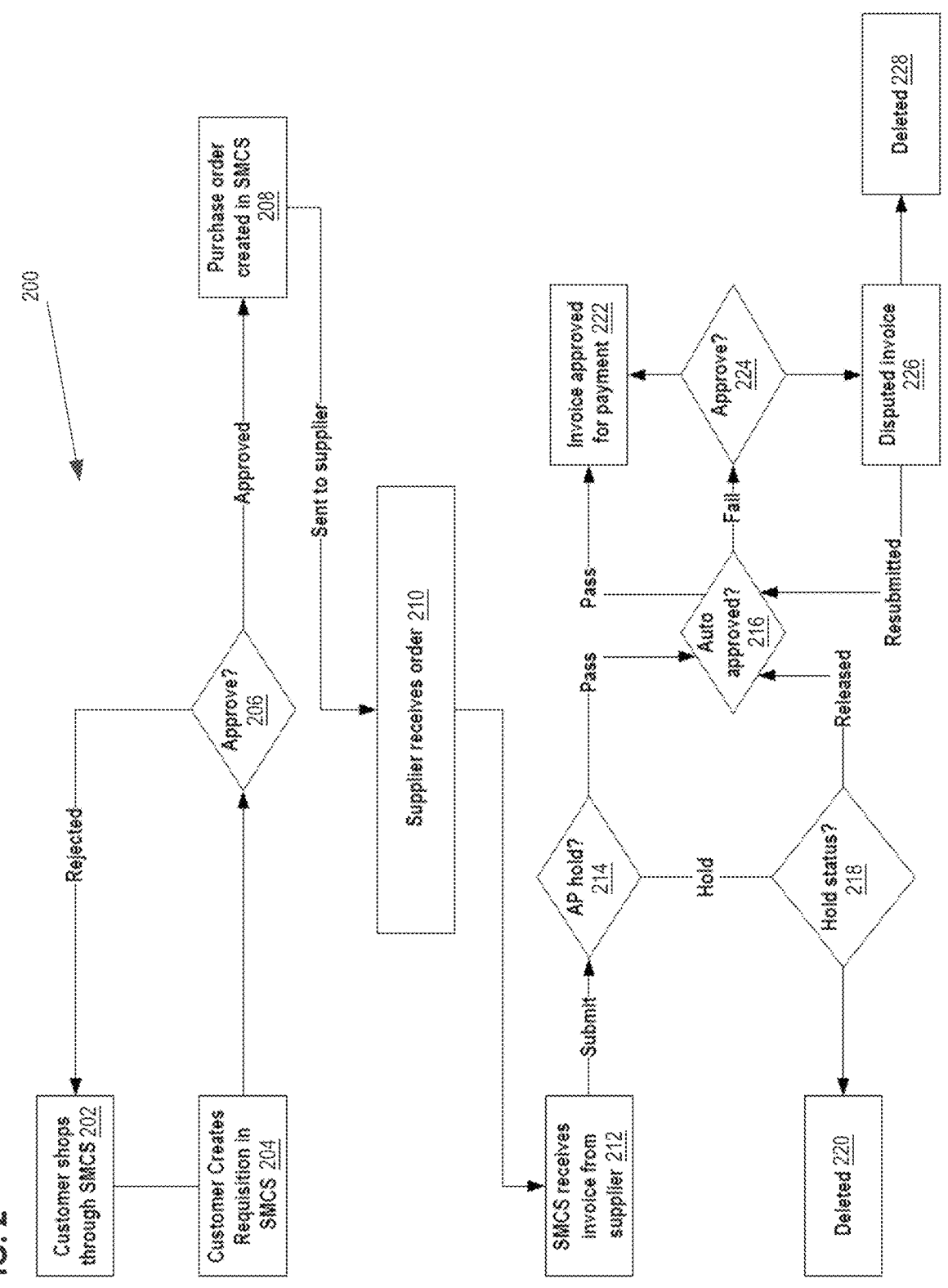
FIG. 2 depicts a flowchart of an example procure-to-pay process that may be facilitated by an electronic spend management system, according to an embodiment.

FIG. 2 depicts a flowchart of an example procure-to-pay process that may be facilitated by an electronic spend management system. Procure-to-pay process 200 may be facilitated by a spend management cloud service (SMCS) such as server 102 or more specifically, spend management layer 142. During performance of the process 200, a buyer computer 112a-m and a supplier computer 122a-n may perform various respective steps. Performance of a step by one of buyer computers 112a-m or one of supplier computer 122a-n may involve interfacing with the server 102 using a local client application (e.g., a web browser application) and a network (e.g., the internet) that connects the computing devices to the server 102. Such interfacing may include receiving data, media and information from the server 102 over the network for presentation by the local client application and involve providing input, data and information from the user to the system via the local client application and the network.

At step 202, server 102 provides an interface through which buyer computers 112*a-m* may select commodities for purchase. For example, a buyer account via one of buyer computers 112*a-m* may browse, or search, catalogs uploaded to the server 102 by one of supplier computers 122*a-n*. The catalogs may have been previously uploaded or otherwise input to the system such as for example by bulk upload (e.g., in comma separated value (CSV) format). Alternatively, the buyer account via one of buyer computers 112*a-m* may shop directly on a website hosted by one or more of supplier computers 122*a-n* whereby items added to an online shopping cart are sent back to the server 102 when the buyer account initiates a check out process via one of buyer computers 112*a-m*. The transfer of purchased items from the online shopping cart back to the system may be facilitated by a protocol for communication of business documents between the supplier computers 122*a-n* or separately hosted websites and the server 102, such as commerce eXtensible Markup Language (cXML) or the like.

At step 204, server 102 creates a requisition for one or more commodities selected for purchase at step 202.

At step 206, server 102 approves or rejects the requisition. Such approval or rejection can be automatic or manual. Automatic rejection or approval may be made by the server 102 according to predefined configuration that may be specified by a buyer account via one or more of buyer computers 112*a-m*. For example, the buyer account via one of buyer computers 112*a-m* may configure a buyer account with the server 102 to automatically approve requisitions from a specified buyer account identifier, for certain specified commodities, and/or for a certain overage amount. If manual, another buyer account user of one of buyer computers 112*a-m* such as an authorized requisitions manager may manually approve or reject the requisition by providing appropriate user input to the server 102. If the requisition is not approved, a new requisition can be created as discussed in steps 202-204.

If the requisition is automatically or manually approved at step 206, then, at step 208, then the server 102 creates and stores a purchase order for the requisition. The server 102 may then send the purchase order to one of supplier computers 122*a-n*. The server 102 may send the purchase order to one of supplier computers 122*a-n* in a variety of different ways and in a variety of different formats. Some of the different ways and formats that the server 102 may send the purchase order to one of supplier computers 122*a-n* may include by Email, by cXML, by proprietary eXtensible Markup Language (XML), by a Value-Added Network (EDI VAN), etc.

At step 210, the server 102 transmit the purchase order to one of one of supplier computers 122*a-n*.

Next at step 212, the server 102 receives an invoice corresponding to the purchase order from one of supplier computers 122*a-n*. The server 102 may receive the invoice from one of supplier computers 122*a-n* in a variety of different ways and in a variety of different formats. For example, the server 102 may receive the invoice from one of supplier computers 122*a-n* by Email, by cXML, by Advance Ship Notice (ASN), etc.

At step 214, the server 102 determines whether an accounts payable hold should be placed on the invoice. The server 102 may make this determination according to configuration provided by the buyer account via one of buyer computers 112*a-m*. For example, the buyer account via one of buyer computers 112*a-m* may configure a buyer account with the server 102 to place an account payable hold on all invoices, or a subset of invoices that satisfy buyer account-specified criteria, so that a buyer account in the account payable department of the buyer account can use the server 102 to review the invoice before the invoice is considered by the server 102 for auto-approval at step 216. If the invoice is not subject to an accounts payable review at step 214, then the invoice may pass for consideration of auto-approval by the system at step 216. If the invoice is subject to an accounts payable review at step 214 and a hold is placed on the invoice, then the invoice may remain in the hold state 218 until is the invoice is deleted at step 220 by a buyer account via one of buyer computers 112*a-m* or released by a buyer account via one of buyer computers 112*a-m* for consideration of auto-approval by the server 102 at step 216.

At step 216, the server 102 considers the invoice for auto-approval of payment. The server 102 may make this consideration according to pre-configured criteria specified by the buyer account via one of buyer computers 112*a-m*. For example, the buyer account via one of buyer computers 112*a-m* may configure a buyer account with the server 102 to auto-approve invoices below a specified monetary amount threshold, invoices for purchase orders submitted by specified buyer accounts, invoices for certain specified commodities or some combination thereof.

If the invoice is auto-approved for payment by the server 102 at step 216, then the system may automatically arrange for payment of the invoice at step 222. The server 102 may make the payment using a variety of different payment methods including for example by the buyer account's net terms, the supplier's P-card, etc.

On the other hand, if the invoice is not auto-approved for payment by the server 102 at step 216, then the invoice may wait for manual approval at step 224 by a buyer account via one of buyer computers 112*a-m*. If manually approved at step 224, then the invoice is paid by the server 102 at step 222. If the buyer account via one of buyer computers 112*a-m* disputes 226 the invoice, then the invoice may eventually be resubmitted for auto-approval, perhaps after modifications by the supplier via one of supplier computers 122*a-n*, or deleted 228.

The above-described procure-to-pay process is presented for purposes of illustrating a basic procurement process that may be facilitated by the electronic spend management system. However, the techniques disclosed herein are not limited to any particular procure-to-pay process. Instead, the techniques may be used in conjunction with a variety of different procure-to-pay processes including those with different arrangement of steps, other steps or only some of the steps depicted in FIG. 2.

4.0 Example Procedure

FIG. 3 depicts a flowchart of an example process for improved procure-to-pay in an electronic spend management system based on supplier and commodity information from a community of buyer accounts. FIG. 3 is shown in simplified, schematic format for purposes of illustrating a clear example and other embodiments may include more, fewer, or different elements connected in various manners. FIG. 3 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 302, the server 102 is programmed or configured to store, in one or more data repositories, transactional data relating to past transactions involving a plurality of commodities between a plurality of buyer entities and a plurality of supplier entities. The transactional data may include any of a buyer identifier, a supplier identifier, date information, a buyer generated tag, a commodity code, product information, pricing information, quantity information, a billing code, location data, and a rating for a supplier of a transaction.

In some embodiments, in step 304, the server 102 is programmed or configured to calculate metric data of one or more overages from the transactional data, wherein each of the one or more overages indicates an amount to which a cost of a commodity item as specified in an invoice exceeds a cost of the commodity item as specified in a requisition or a purchase order, the invoice being generated in response to the requisition or the purchase order. Calculating the one or more overages from the transactional data may include comparing pricing information for one or more commodity items submitted in one or more purchase orders to pricing information for the one or more commodity items returned in one or more invoices in response to the one or more purchase orders. For example, if a buyer account submits a purchase order that specifies an order for a chair at $100 and a supplier generates an invoice in response to the purchase order at $110 dollars for the chair, the overage amount is $10 with an overage rate of 10%.

Additionally, calculating metric data of one or more overages from the transactional data may include determining, for a specific commodity item, specific buyer entity, or specific supplier entity, an average overage amount or other aggregate statistics at least in part by aggregating a plurality of overages from transactions between the plurality of buyer entities and the plurality of supplier entities. These aggregate measures calculated from multiple transactions between a variety of buyer entities and supplier entities may reveal specific trends or other characteristics related to overages incurred within the community. In turn, the metric data enables accurate estimates of overages that can be used to calculate a projected total cost for any given buyer entity, supplier entity, or commodity item or intelligent decisions to approve or disapprove invoices or other data related to overages. Furthermore, this step may be performed in response to receiving a request to generate a requisition or purchase order.

Metric data of one or more overages may include overage rates for a supplier and commodity item, a supplier, a commodity item, or a category of a commodities. Commodities may exist in a commodity hierarchy. For example, a commodity category may include "TVs" and the commodity category "TVs" may include different commodity items by different vendors. The top of a commodity hierarchy may include broad categories of commodities such as "Electronics". The bottom of a commodity hierarchy may include individual commodity items, such as a TV of a specific make and model. In a commodity hierarchy, when information is available at different levels of the hierarchy, the more detailed information at the bottom of the hierarchy is preferred for making better estimates and calculations. For example, using a TV of a specific make and model from the bottom of a commodity hierarchy to predict overages as opposed to using data from the "Electronics" commodity category at the top of the commodity hierarchy can be used to more accurately predict overages.

In some embodiments, metric data of one or more overages is calculated for a specific supplier that sells a specific commodity item. For example, metric data of one or more overages is calculated for the commodity item 'chair' sold by supplier 'Chair Warehouse'. The transactional data may include multiple transactions for the commodity item 'chair' sold by supplier 'Chair Warehouse' to many different buyer accounts. The overages or overage rates for each of the transactions for the specific commodity item 'chair' sold by the specific supplier 'Chair Warehouse' may be averaged to produce a community wide overage rate for the specific supplier and specific commodity item.

In some embodiments, metric data of one or more overages is calculated for a specific supplier. For example, metric data of one or more overages is calculated for all commodity items sold by the supplier 'Chair Warehouse'. The transactional data may include multiple transactions for all commodity items sold by supplier 'Chair Warehouse' to many different buyer accounts. The overages or overage rates for each of the transactions that include the specific supplier 'Chair Warehouse' may be averaged to produce a community wide overage rate for the specific supplier.

In some embodiments, metric data of one or more overages is calculated for a specific commodity item or commodity category. For example, metric data of one or more overages is calculated for all commodity items included in the commodity category 'furniture'. The transactional data may include multiple transactions for all commodity items in the 'furniture' category which may include the commodity items 'chair', 'couch', 'bed', etc. The overages or overage rates for each of the transactions that include commodity items in the specific commodity category may be averaged to produce a community wide overage rate for the specific commodity category or specific commodity item.

In some embodiments, metric data of one or more overages can be calculated for categories of suppliers. Suppliers can be categorized by industry, company size, revenue volume, location, etc. In some embodiments, only overage data from suppliers in the same one or more categories as the supplier for the current transaction is considered in calculating metric data of one or more overages and projecting total costs for the current buyer account. Metric data of one or more overages can also be calculated for categories of buyer accounts. In some embodiments, only overage data from "similar" buyer accounts as the current buyer account is considered in calculating metric data of one or more overages and projecting total costs for the current buyer account. Similarity of buyer accounts may be determined based on commodities of items that each of the buyer accounts purchase, time of year when majority of the each of the buyer accounts' purchases occur, primary industry that each of the buyer accounts is included in, average purchase amount, or any other relevant data points.

In some embodiments, subjective factors can also be considered for calculating metric data of one or more overages. For example, other buyer accounts might provide comments that a certain supplier tends to overcharge shipping fees or enforce late payment penalties. Overage or supplier ratings may be incorporated into calculating metric data of one or more overages. The time when a purchase is made may be included as a factor when calculating metric data of one or more overages. For example, based on seasonality, different commodities may be in higher demand and have higher costs at different times of the year.

In step 306, the server 102 is programmed or configured to receive, from a computer associated with a buyer entity, a request to generate a requisition or a purchase order for one or more commodity items. For example, a requisition may be created by a buyer account such as discussed with respect to steps 202-204 of FIG. 2. Alternatively, a purchase order may be created such as discussed with respect to step 208 of FIG. 2.

In some embodiments, in step 308, the server 102 is programmed or configured to identify, from the request received in step 306, a supplier identification (ID) associated with a particular supplier entity of the plurality of supplier entities or a commodity ID associated with a particular commodity of the plurality of commodities, for a particular commodity item of the one or more commodity items. As discussed in step 306, the request may include a requisition or purchase order. The requisition or purchase order may include a supplier ID and/or a commodity ID. In some embodiments, a requisition or purchase order includes a list of commodity items where each commodity item is associated with a price and a supplier ID.

In some embodiments, in step 310, the server 102 is programmed or configured to a projected total cost for the particular commodity item from the metric data using the supplier ID or the commodity ID. The projected total cost indicates a probable cost for the particular commodity item based on previous transactions that included the particular commodity, the particular supplier entity, or other aspects of the commodity item indicated in the requisition or purchase order. The projected total cost can be calculated using additional data from the request including requestor data that identifies a buyer entity, approver data that identifies an approver or approver group, and one or more dates that may include when the request was submitted or approval is due by.

For example, as discussed in step 304, metric data of one or more overages may be calculated for a specific supplier and a specific commodity, a specific supplier, or a specific commodity. For the case where metric data of one or more overages exists for a specific supplier and a specific commodity, if the particular supplier and particular commodity identified based on the requisition or purchase order match the specific supplier that sells a specific commodity from the metric data of one or more overages, the overage rate for the specific supplier that sells a specific commodity may be used to calculate the projected total cost. As an example, if the overage rate for a commodity of 'furniture' sold by supplier 'Chair Warehouse' is 10%, and the request to generate a requisition or purchase order specifies an order for one 'chair' from 'Chair Warehouse' for $100, the projected total cost of the 'chair' from 'Chair Warehouse' is $110 due to the calculated 10% overage rate of 'Chair Warehouse' selling the commodity 'furniture'.

For the case that metric data of one or more overages does not exist for a specific supplier and a specific commodity but exists for the specific supplier, if the particular supplier identified based on the requisition or purchase order matches the specific supplier from the metric data of one or more overages, the overage rate for the specific supplier may be used to calculate the projected total cost. As an example, if the overage rate for a supplier 'Furniture Warehouse' is 20%, and the request to generate a requisition or purchase order specifies an order for one 'chair' from 'Furniture Warehouse' for $100, the projected total cost of the 'chair' from 'Chair Warehouse' is $120 because of the overage rate of the supplier. due to the calculated 20% overage rate of 'Chair Warehouse'. The aggregate overage for 'furniture' in the community of buyer accounts can also be taken into consideration.

For the case that metric data of one or more overages does not exist for a specific supplier and a specific commodity or for the specific supplier but exists for a specific commodity category, if a particular commodity category of the particular commodity item identified based on the requisition or purchase order matches the specific commodity category from the metric data of one or more overages, the overage rate for the specific commodity category may be used to calculate the projected total cost. As an example, if the overage rate for a commodity category 'furniture' is 30%, and the request to generate a requisition or purchase order specifies an order for one 'chair' from the 'furniture' commodity category for $100, the projected total cost of the 'chair' is $130 due to the calculated 30% overage rate of the commodity category 'furniture'.

In some embodiments, the server 102 is programmed or configured to determine an approval group based on the projected total cost. An approval group comprises a group of buyer accounts associated with approvers that are required to approve a requisition before a purchase order is created based on the requisition. The projected total cost can determine whether the requisition is auto-approved based on existing community overage metrics, whether an additional approver is required based on existing community overage metrics, whether further analysis required based on additional community data, etc. Additionally, the projected total cost can determine which approval members are included in an approval group. For example, historical spend data for a buyer account may indicate that any requisition amount above $100,000 usually requires the approval of a Branch Manager and Chief Executive Offer. The historical spend data may also indicate that any requisition amount above $50,000 but below $100,000 may only require the approval of a Branch Manager.

In some embodiments, the server 102 is programmed or configured to determine an approval group based on the projected total cost of a requisition. For example, the projected total cost for one of five commodity items in a requisition may be large, but if the projected total cost for the entire requisition (i.e. five commodity items) is less than a threshold amount, the requisition can still be approved by a single approver.

Each member of an approval group may be identified by a unique ID or email address. The server 102 may be programmed to automatically send approval requests to each approval group member determined to be in the respective approval group, receive approvals for each member of the approval group, and then automatically generate a purchase order in response to receiving approval indications. Approval groups allow the approval chain portion of the procure-to-pay process to become more automated and efficient by quickly and efficiently determining what approvals are needed to complete a purchase order and then automating the approval transmissions and reception.

In some embodiments, in step 312, the server 102 is programmed or configured to, in response to determining that the projected total cost for the particular commodity item is less than a threshold value, store an approval status in a database or transmit an approval of ordering the particular commodity item. A threshold value may be set or configured by a requestor or approver through any graphical user interface (GUI). Alternatively, the system may provide a standard threshold value. For example, an approver, as discussed at step 206 from FIG. 2, may provide a threshold value for automatically approving ordering of the particular commodity item. Additionally, a requisition or purchase order that specifies multiple commodity items may be automatically approved based on determining that each projected total cost for each commodity item of the multiple commodity items is less than a respective threshold value.

Further, the server 102 may be programmed or configured to, in response to determining that the projected total cost for the particular commodity item is greater than a threshold value, store a rejection status in a database or transmit a rejection of ordering the particular commodity item. An indication of an approval (or rejection) may be transmitted to a computer associated with the buyer entity and may indicate that the request for procuring the particular commodity item is approved, will be approved, is rejected, or will be rejected based on the projected total cost the particular commodity item.

A threshold value indicates an amount limit that a buyer account is willing to spend for a commodity item or group of commodity items. A threshold value may also specify an amount rate limit that a buyer account is willing to spend for a commodity item or group of commodity items. For example, for a 'chair' commodity item, an approver may specify a threshold value of $105 for each chair. If it is determined that the projected total cost of each chair is less than $105, then the requisition may be automatically approved and converted into a purchase order. Alternatively, if it is determined that the projected total cost of each chair is greater than $105, different actions may be taken such as requiring the manual approval of such requisitions.

In some embodiments, the server 102 is programmed or configured to, in response to transmitting the approval, create and transmit a purchase order to a computer associated with the particular supplier entity. The server 102 may be further programmed to, in response to transmitting the purchase order, receive an invoice that corresponds to the purchase order. The invoice may include a final cost amount for the particular commodity item. The server 102 may be further programmed to determine that the final cost amount is equal to or less than the projected total cost for the particular commodity item, and in response, transmit an approval of paying the invoice.

In some embodiments, the server 102 is programmed or configured to determine, based on the metric data of one or more overages, one or more alternative supplier entities of the plurality of supplier entities that have a lower projected total cost for the particular commodity item than the projected total cost for the particular commodity item. This typically occurs between steps 310 and 312, in interacting with the purchase requester. The server 102 may also be programmed or configured to calculate a plurality of projected total costs for the particular commodity item, each projected total cost of the plurality of projected total costs based on the metric data of one or more overages related to the particular commodity item and a supplier entity of the plurality of supplier entities, wherein each supplier entity of the plurality of supplier entities is a different supplier entity. The server 102 may be further programmed to identify the one or more alternative supplier entities of the one or more supplier entities or one or more alternative commodity items based on determining that the one or more alternative supplier entities are associated with a lower projected total cost for the particular commodity item than the projected total cost for the particular commodity item.

In some embodiments, the server 102 is programmed or configured to generate and cause displaying, at a computer associated with the buyer entity, a graphical user interface (GUI) that includes a visible representation of the projected total cost of the particular commodity item. The GUI may include a visible representation of the projected total cost of the particular commodity item in comparison with a visible representation of a cost of the particular commodity item specified in the requisition or purchase order. The GUI may provide one or more selectable options comprising options for selecting an alternate supplier of the one or more alternative supplier entities or an alternate commodity item, which may be determined by the server 102 as discussed above. Additionally, the GUI may show, for each alternate supplier or commodity item, the supplier ID, the item description, the total projected cost, the reason why the alternative is chosen and presented, whether the selection of this alternative enables the requisition to automatically pass the internal approval criterion, etc. This explanatory data is used to help the buyer account make a decision in an efficient manner.

The server may be programmed to receive input through the GUI that allows selecting a particular selectable option of the one or more selectable options which specifies an alternative supplier entity of the one or more alternative supplier entities. The server 102 may be further programmed to, in response to receiving input, create and transmit a purchase order to a computer associated with the selected alternative supplier entity. The server 102 may be further programmed to, in response to transmitting the purchase order, receive an invoice that corresponds to the purchase order. The invoice may include a final cost amount for the particular commodity item. The server 102 may be further programmed to determine that the final cost amount is equal to or less than the projected total cost for the particular commodity item, and in response, automatically approve the invoice for payment.

Using the above discussed techniques, the efficiency of the procure-to-pay process as discussed with respect to FIG. 2 is improved. By providing more accurate pricing projections, buyer accounts can be sure that their requisitions for commodities are within allocated budget. Techniques discussed herein enhance the procure-to-pay process by facilitating the automatic approval of requisitions, automatic generation of purchase orders, and automatic approval of invoices for payment based on the enhanced pricing projections as discussed herein. By providing accurate predictions of cost early in the procure-to-pay process, techniques herein prevent excessive compute and processing resources devoted to communication and negotiation between buyer and supplier that are produced from unexpected overages. As a result, compute resources and memory are conserved by reducing the amount of stalled and restarted agreements due to unexpected overages. Thus, the techniques herein result in a procure-to-pay process that uses fewer CPU cycles and less memory to complete a commodity order.

Additionally, techniques discussed herein that facilitate the automatic approval of requisitions, automatic generation of purchase orders, and automatic approval of invoices for payment improve the accuracy and integrity of transactional data between buyer accounts and supplier accounts and deters malicious activity such as fraud by a third party. The techniques that facilitate the automatic approval of requisitions, purchase orders, and invoices reduce the attack surface area of potential malicious activity for the procure-topay process by providing less access points to transactional data and thus increase data integrity and security. As such, the network resources, memory, and CPU cycles previously spent on ensuring data integrity, accuracy, and security from manual procure-to-pay transactions between buyer accounts and supplier accounts are conserved due to the techniques discussed herein.

5.0 Example Graphical User Interface

Figure 4:
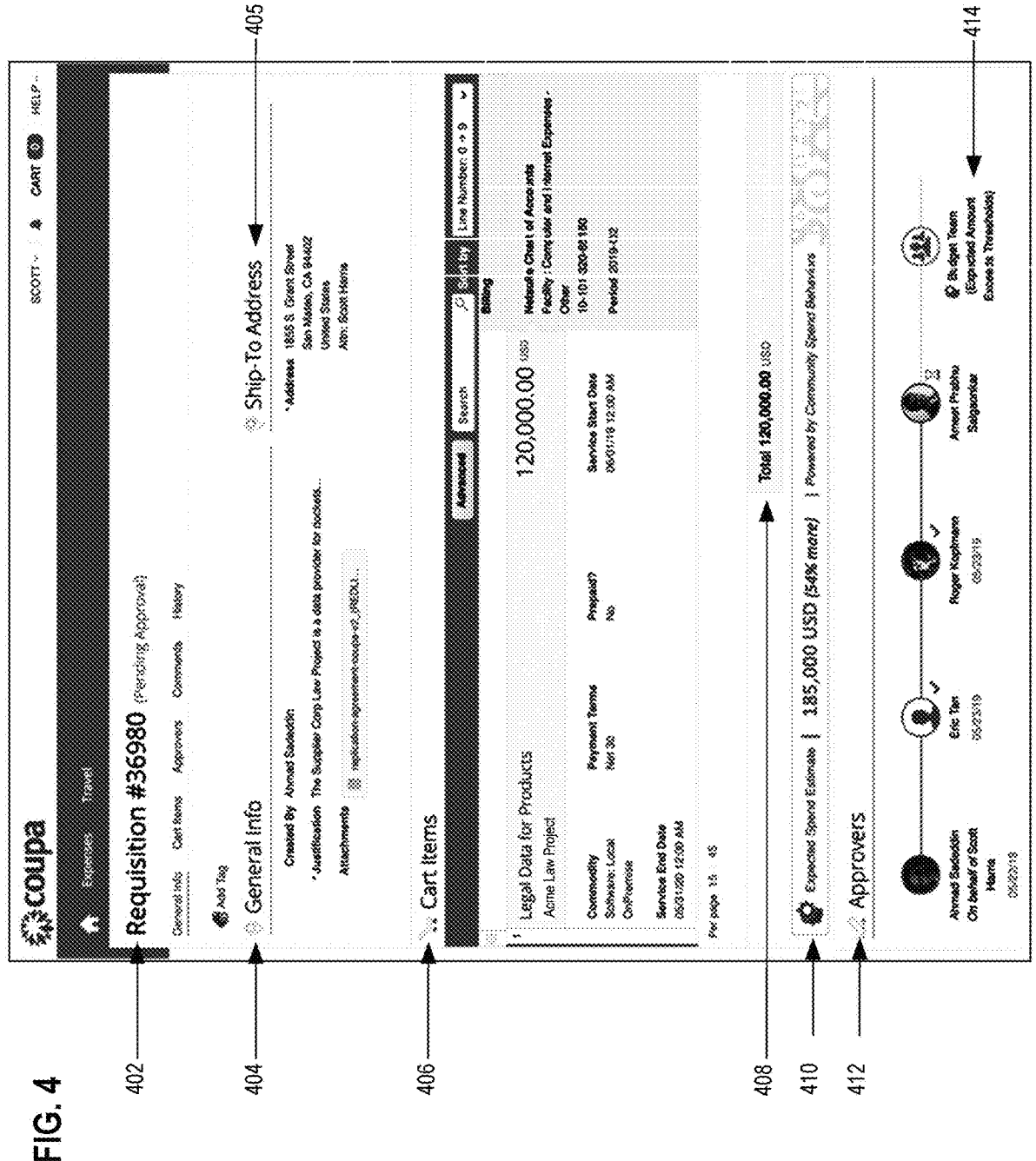
FIG. 4 depicts a screenshot of a graphical user interface for a requisition in an improved procure-to-pay process, according to an embodiment.

FIG. 4 depicts a screenshot of a graphical user interface for a requisition in an improved procure-to-pay process. In the interface of FIG. 4, text indication 402 indicates a requisition with corresponding requisition number. Text indication 402 also indicates that the requisition is pending approval. Text indication 404 and associated details provide general information about the requisition such as a user that the requisition was created by, a justification or reason for creating the requisition, and any attachments related to the requisition. Text indication 405 and associated details provide a shipping address for delivery. Text indication 406 and associated details provide cart items such as commodity items requested for order and related information. In this example, the commodity item for order is "Legal Data for Products" from the supplier "Acme Law Project" at a price of "$120,000.00". Related information about the cart items include information about the commodity, e.g. "Software: Local OnPremise", payment terms, e.g. "Net 30", an indication of whether the commodity item was prepaid, service state date, and service end date. Billing information for the supplier is also included. Text indication 408 specifies a total cost of the requested commodity items. Text indication 410 provides a projected total cost e.g. "Expected spend estimate $185,000 (54% more)", of the commodity items specified in the requisition. The projected total cost depicted in text indication 410 may be calculated or determined as discussed with respect to FIG. 3. Text indication 410 also provides an indication of an overage percentage, i.e. "(54% more)", with respect to the total cost 408. Text indication 412 provides an approval chain or list of approvers that are required to approve the requisition before the requisition is converted into a purchase order and sent to a supplier. Each approver in the list may comprise an approver, e.g. "Ahmad Sadeddin", "Eric Tan", "Roger Kopfmann", "Ameet Prabhu", or an approver group, e.g. "Budget Team". In this example, approvers "Ahmad Sadeddin", "Eric Tan", and "Roger Kopfmann" have already approved the requisition. The approval of approver "Ameet Prabhu" is pending approval. Text indication 414 may provide an indication or prediction as to whether approval group "Budget Team" will approve the requisition based on the project total cost provided by text indication 410 and one or more thresholds. The one or more thresholds may be provided or specified as discussed with respect to FIG. 3.

6.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
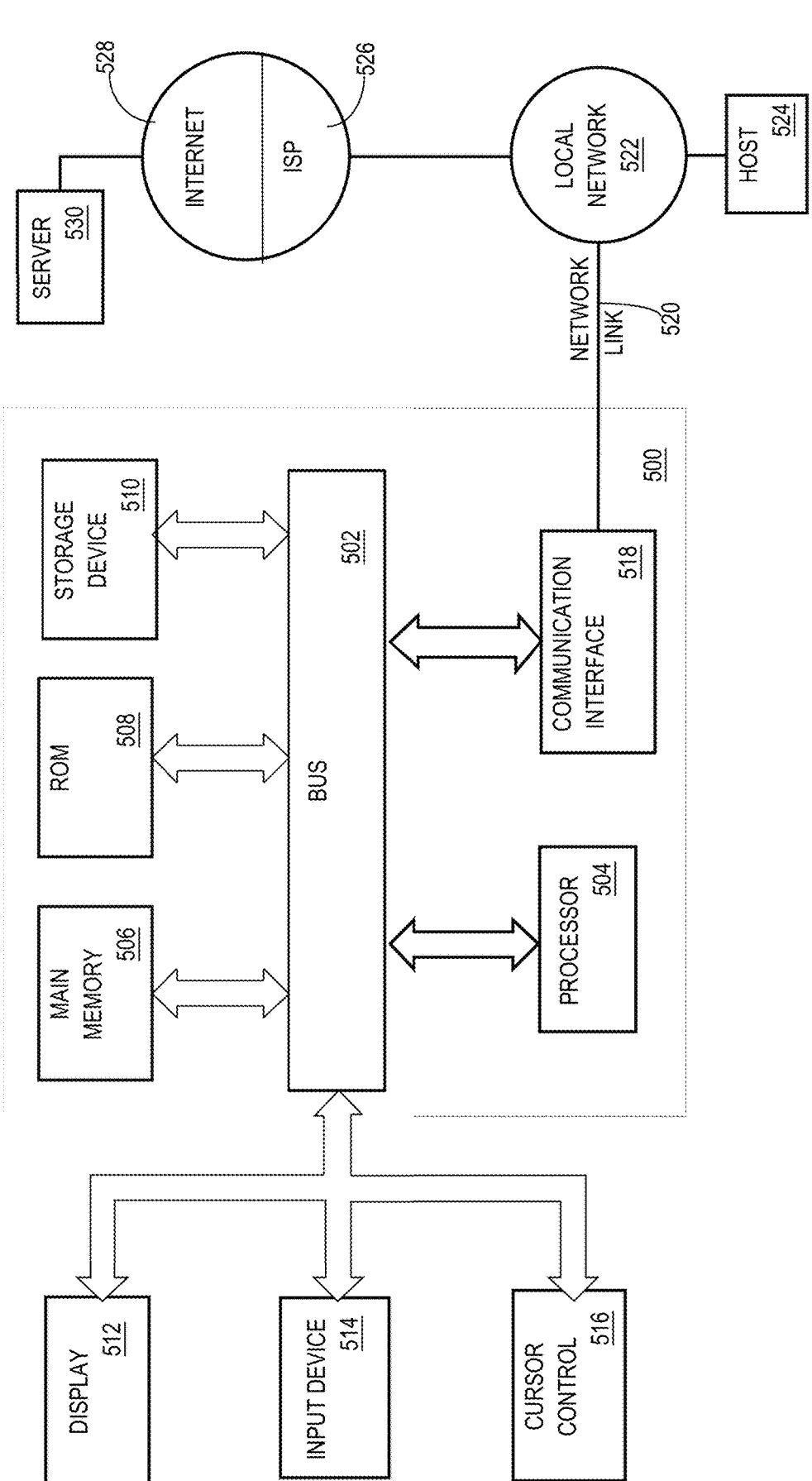
FIG. 5 is a block diagram that illustrates a computer system upon which an embodiment of the invention may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:

storing, in one or more data repositories, transactional data relating to past transactions involving a plurality of commodities between a plurality of buyer entities and a plurality of supplier entities;

calculating metric data of one or more overages from the transactional data, wherein each of the one or more overages indicates an amount to which a cost of a commodity item as specified in an invoice exceeds a cost of the commodity item as specified in a requisition, the invoice being generated in response to the requisition, the calculating of metric data further including determining, for the commodity item, an average overage amount at least in part by aggregating a plurality of overages from transactions between the plurality of buyer entities and the plurality of supplier entities, the metric data identifying trends related to overages within a community and indicating an estimate of overages associated with the commodity item;

receiving, from a computer associated with a buyer entity, a request to generate a requisition for one or more commodity items, the one or more commodity items including the commodity item;

identifying, from the request, a supplier identification (ID) associated with a supplier entity of the plurality of supplier entities and a commodity ID associated with the commodity item;

calculating a projected total cost for the commodity item from the metric data using the supplier ID or the commodity ID, the projected total cost indicating a probable cost for the commodity item based on previous transactions that included the particular commodity item and being based on the metric data of one or more overages related to the supplier entity and the commodity item;

in response to determining that the projected total cost for the commodity item is less than a threshold value, automatically approving the requisition and transmitting an approval of the requisition to the computer associated with the buyer entity, wherein the threshold value is set via one or more interactions with a graphical user interface (GUI);

in response to determining that the projected total cost for the particular commodity item is greater than or equal to the threshold value, selecting and alerting an approval group of one or more approvers that are required to approve the requisition for a buyer account of the buyer entity, the approval group being selected by a server computer and comprising one or more buyer accounts associated with the one or more approvers that are required to approve the requisition before a first purchase order is created based on the requisition, the approval group being selected based on at least projected total cost and historical spend data of the buyer account of the buyer entity requesting the requisition; and in response to determining that the projected total cost for the commodity item is greater than or equal to the threshold value:

generating and causing displaying, at the computer associated with the buyer entity, a GUI that includes a visible representation of the projected total cost in comparison with a visible representation of a cost of the commodity item, a list of approvers that are required to approve the requisition and an explanation for why the request was not automatically approved, and one or more selectable options, the one or more selectable options for selecting an alternate supplier from among one or more alternative suppliers, the visible representation of the one or more selectable options indicating, for each of the one or more alternative suppliers, whether a selection of the alternate supplier enables the requisition to automatically pass an internal approval criterion, wherein a determination as to whether each of the one or more alternate suppliers enables the requisition to automatically pass an internal approval criterion is based on the metric data;

receiving input through the GUI of a particular selectable option of the one or more selectable options that specifies an alternative supplier entity of the one or more alternative suppliers;

creating and transmitting a second purchase order to a computer associated with the alternative supplier entity;

in response to receiving a second invoice that corresponds to the second purchase order, automatically approving the second invoice for payment; and automatically transmitting a payment of the second invoice based on the automatic approval of the second invoice;

wherein at least the automatic approval of the requisition, the automatic approval of the second invoice, and the automatic transmitting of the payment of the second invoice are configured to reduce network resources and computational cycles associated with maintaining data integrity and security associated with the buyer entity, the supplier entity, and the alternative supplier entity; and wherein use of the projected total cost in the determining that the projected total cost for the commodity item is less than the threshold value and the determining that the projected total cost for the commodity item is greater than or equal to the threshold value is configured to conserve compute resources.

2. The method of claim 1, wherein the transactional data includes any of a buyer identifier, a supplier identifier, a buyer generated tag, a commodity code, product information, pricing information, a billing code, location data, and a rating for a supplier of a transaction.

3. The method of claim 1, wherein calculating metric data of one or more overages from the transactional data includes comparing pricing information for one or more commodity items as specified in one or more requisitions or purchase orders to pricing information for the one or more commodity items as specified in one or more invoices generated in response to the one or more requisitions or purchase orders.

4. The method of claim 1, wherein calculating metric data of one or more overages from the transactional data includes determining, for of a specific supplier entity, aggregate statistics from a plurality of overages from the past transactions between the plurality of buyer entities and the plurality of supplier entities.

5. The method of claim 1, wherein calculating metric data of one or more overages from the transactional data is performed in response to identifying the supplier ID or commodity ID for the commodity item.

6. The method of claim 1, further comprising:
in response to transmitting the approval, creating the purchase order and transmitting the purchase order to a computer associated with the particular supplier entity;
receiving an invoice corresponding to the purchase order, the invoice including a final cost amount for the particular commodity item;
in response to determining the final cost amount is within a certain percentage of the projected total cost, transmitting an approval of paying the invoice.

7. The method of claim 1, further comprising:
identifying from the request, requestor data, approver data, or one or more dates, and
wherein the calculating the projected total cost for the particular commodity item from the metric data further uses the requestor data, approver data, or the one or more dates.

8. The method of claim 1, further comprising:
determining, based on the metric data of one or more overages, one or more alternative commodity items that have a lower projected total cost than the projected total cost of the commodity item.

9. The method of claim 1, further comprising:
in response to determining that metric data of one or more overages does not exist for the particular supplier entity and a second particular commodity item that are identified in a second request, calculating the projected total cost for the particular second commodity item based on the metric data of one or more overages related to the particular supplier entity.

10. The method of claim 9, further comprising:
in response to determining that metric data of one or more overages does not exist for the particular supplier entity, calculating the projected total cost for the second particular commodity item based on the metric data of one or more overages related to the particular commodity.

11. The method of claim 1, the commodity being in a commodity hierarchy comprised of a plurality of commodity categories, and further comprising using the commodity hierarchy in calculating the metric data.

12. A system comprising:
one or more processors;
a memory storing instructions which, when executed by the one or more processors, cause performance of:
storing, in one or more data repositories, transactional data relating to past transactions involving a plurality of commodities between a plurality of buyer entities and a plurality of supplier entities;
calculating metric data of one or more overages from the transactional data, wherein each of the one or more overages indicates an amount to which a cost of a commodity item as specified in an invoice exceeds a cost of the commodity item as specified in a requisition, the invoice being generated in response to the requisition, the calculating of metric data further including determining, for the commodity item, an average overage amount at least in part by aggregating a plurality of overages from transactions between the plurality of buyer entities and the plurality of supplier entities, the metric data identifying trends related to overages within a community and indicating an estimate of overages associated with the commodity item;
receiving, from a computer associated with a buyer entity, a request to generate a requisition for one or more commodity items, the one or more commodity items including the commodity item;
identifying, from the request, a supplier identification (ID) associated with a supplier entity of the plurality of supplier entities and a commodity ID associated with the commodity item;
calculating a projected total cost for the commodity item from the metric data using the supplier ID or the commodity ID, the projected total cost indicating a probable cost for the commodity item based on previous transactions that included the particular commodity item and being based on the metric data of one or more overages related to the supplier entity and the commodity item;
in response to determining that the projected total cost for the particular commodity item is less than a threshold value, automatically approving the requisition and transmitting an approval of ordering the particular commodity item the requisition to the computer associated with the buyer entity, wherein the threshold value is set via one or more interactions with a graphical user interface (GUI);
in response to determining that the projected total cost for the particular commodity item is greater than or equal to the threshold value, selecting and alerting an approval group of one or more approvers that are required to approve the requisition for a buyer account of the buyer entity, the approval group being selected by a server and comprising one or more buyer accounts associated with the one or more approvers that are required to approve the requisition before a purchase order is created based on the requisition, the approval group being selected based on at least projected total cost and historical spend data of the buyer account of the buyer entity requesting the requisition; and
in response to determining that the projected total cost for the commodity item is greater than or equal to the threshold value:
generating and causing displaying, at the computer associated with the buyer entity, a GUI that includes a visible representation of the projected total cost in comparison with a visible representation of a cost of the commodity item, a list of approvers that are required to approve the requisition and an explanation for why the request was not automatically approved, and one or more selectable options, the one or more selectable options for selecting an alternate supplier from among one or more alternative suppliers, the visible representation of the one or more selectable options indicating, for each of the one or more alternative suppliers, whether a selection of the alternate supplier enables the requisition to automatically pass an internal approval criterion, wherein a determination as to whether each of the one or more alternate suppliers enables the requisition to automatically pass an internal approval criterion is based on the metric data;

receiving input through the GUI of a particular select-
able option of the one or more selectable options that
specifies an alternative supplier entity of the one or
more alternative suppliers;

creating and transmitting a second purchase order to a
computer associated with the alternative supplier
entity;

in response to receiving a second invoice that corre-
sponds to the second purchase order, automatically
approving the second invoice for payment; and automatically transmitting a payment of the second
invoice based on the automatic approval of the
second invoice;

wherein at least the automatic approval of the requisition,
the automatic approval of the second invoice, and the
automatic transmitting of the payment of the second
invoice are configured to reduce network resources and
computational cycles associated with maintaining data
integrity and security associated with the buyer entity,
the supplier entity, and the alternative supplier entity;
and wherein use of the projected total cost in the determining
that the projected total cost for the commodity item is
less than the threshold value and the determining that
the projected total cost for the commodity item is
greater than or equal to the threshold value is config-
ured to conserve compute resources.

13. The system of claim 12, wherein the transactional data
includes any of a buyer identifier, a supplier identifier, a
buyer generated tag, a commodity code, product informa-
tion, pricing information, a billing code, location data, and
a rating for a supplier of a transaction.

14. The system of claim 12, wherein calculating metric
data of one or more overages from the transactional data
includes comparing pricing information for one or more
commodity items as specified in one or more requisitions or
purchase orders to pricing information for the one or more
commodity items as specified in one or more invoices
generated in response to the one or more requisitions or
purchase orders.

15. The system of claim 12, wherein calculating metric
data of one or more overages from the transactional data
includes determining, for a specific supplier entity, aggre-
gate statistics from a plurality of overages from the past
transactions between the plurality of buyer entities and the
plurality of supplier entities.

16. The system of claim 12, wherein calculating metric
data of one or more overages from the transactional data is
performed in response to identifying the supplier ID or
commodity ID for the commodity item.

17. The system of claim 12, the commodity being in a
commodity hierarchy comprised of a plurality of commodity
categories, and further comprising using the commodity
hierarchy in calculating the metric data.

* * * * *